United States Patent
Koch

[11] 3,938,605
[45] Feb. 17, 1976

[54] TRACK SUSPENSION
[75] Inventor: Stanislaus H. Koch, London, Canada
[73] Assignee: Clark Equipment Company, Buchanan, Mich.
[22] Filed: June 24, 1974
[21] Appl. No.: 482,408

[52] U.S. Cl................................. 180/9.5; 305/24
[51] Int. Cl.$^2$......................................... B62D 55/10
[58] Field of Search........... 180/5 R, 9.5, 9.52, 9.54; 305/10, 24, 25, 27

[56] References Cited
UNITED STATES PATENTS

| | | | |
|---|---|---|---|
| 2,445,723 | 7/1948 | Brown.................................. | 305/27 |
| 3,289,779 | 12/1966 | Feucht................................ | 180/9.5 |
| 3,446,303 | 5/1969 | Trapp.................................. | 305/25 |
| 3,447,620 | 6/1969 | Schoonover....................... | 180/9.52 |
| 3,447,621 | 6/1969 | Schoonover....................... | 180/9.52 |
| 3,489,234 | 1/1970 | Lorenz................................ | 180/5 R |
| 3,620,318 | 11/1971 | Gostomski.......................... | 180/5 R |
| 3,761,143 | 9/1973 | Russ..................................... | 305/24 |
| 3,784,263 | 1/1974 | Hendrickson....................... | 305/24 |
| 3,788,412 | 1/1974 | Vincent............................... | 305/25 |

Primary Examiner—Philip Goodman
Assistant Examiner—John A. Carroll
Attorney, Agent, or Firm—Jack E. Toliver

[57] ABSTRACT

A track suspension for a track laying vehicle having a pair of endless tracks, one on each side of the vehicle body, independently driven by drive sprockets at the front. Each track suspension unit has an elongated suspension beam pivoted at one end behind the drive sprocket and sprung at the opposite end to the vehicle body providing a major suspension primarily responding to major changes in ground reaction forces. Inside each track and supported on the beam are trucks, each having a walking beam pivotally mounted on the suspension beam and providing a minor oscillatory suspension motion responding to minor changes on ground reaction forces.

7 Claims, 7 Drawing Figures

TRACK SUSPENSION

BACKGROUND OF THE INVENTION

The invention pertains to the art of track suspensions for an endless track laying vehicle and more particularly to a rough terrain tractor type vehicle such as a tracked log skidder.

DESCRIPTION OF THE PRIOR ART

In logging operations it is not unusual to encounter all types of terrain ranging from swampy to hilly, overgrown with underbrush, or rocky and frequently obstructed by fallen logs and stumps. Tracked vehicles have operated in such terrain successfully, but the track suspensions have been more or less conventional with little attention to the special conditions of forestry operation. Usually the track is driven by a sprocket drive wheel at the front attached to the main frame. An idler wheel the size of the sprocket is attached to the main frame at the rear. A tensioning idler may be used for tightening the track. Clusters of small bogie wheels ride upon the lower run of the track to maintain it in contact with the ground. The only real suspension is from a bogie wheel frame which attaches to the main frame through springs.

SUMMARY OF THE INVENTION

The present invention provides a track suspension supporting each track from a longitudinally extending suspension beam pivotally mounted to the frame of the vehicle at the front and sprung from the vehicle frame at the rear providing a major suspension for absorbing major ground reaction forces.

A truck is pivotally mounted on each suspension beam. It carries a pair of bogie wheels which roll on the lower run of the track. The trucks have a walking beam pivotally mounted intermediate its ends to the suspension beam. The bogie wheels are mounted at the opposite ends of the walking beam. They oscillate the walking beam about the intermediate pivot providing a minor oscillatory suspension motion responding to the minor ground reaction forces.

Furthermore, in the track suspension according to the invention an idler wheel attached to the frame at the rear is eliminated and instead the track is independently sprung and the rearmost bogie wheel of the last truck runs inside of the closed rear loop of the track doubling as an idler.

The invention also provides a track tension adjustment by which the walking beam of each truck can be shifted longitudinally relative to the suspension beam by means of a threaded actuator operating in conjunction with a guide and slot arrangement in the suspension beam.

In addition, each suspension beam is sprung from the frame on a stack of rubber biscuits. A center deflection rod holds the biscuits and is pivotally connected to the suspension beam by a guide shoe at the bottom. A guide frame extends over the biscuits and is rigidly mounted to the vehicle frame. It has vertical slots receiving lateral projections on the guide shoe which provide continuous lateral support to the track suspension during turning movements of the vehicle.

The present invention provides a rugged, highly flexible track suspension especially suited for negotiating rough terrain found in logging areas.

The track suspension has a major suspension motion which operates approximately the full length of the track. This enables the track to walk out of deep depressions or climb over logs and stumps while maintaining traction. The walking beam trucks provide a minor oscillatory motion which increases the track response or flexibility to minor ground reaction forces.

Another advantage is that track adjustments are performed by shifting the entire truck assemblies longitudinally relative to the suspension beam by moving the pivot of the walking beam. By this arrangement a separate track tensioning mechanism is avoided and track tensioning becomes a part of the suspension itself.

Another advantage which enables the track to negotiate large bolders and stumps is that oversized bogie wheels are used. To accommodate their size the suspension beam has longitudinally spaced cut outs above each bogie wheel permitting running clearance above the beam for each wheel.

Contributing stability to the suspension is the novel rubber biscuit spring at the rear of each suspension beam which absorbs the primary ground reaction forces and in addition provides lateral stability in a turn.

These and other advantages will be more apparent by referring to the following detailed description of the invention which proceeds with a description of the drawings.

DESCRIPTION OF THE PREFERRED EMBODIMENT

Figure 1:
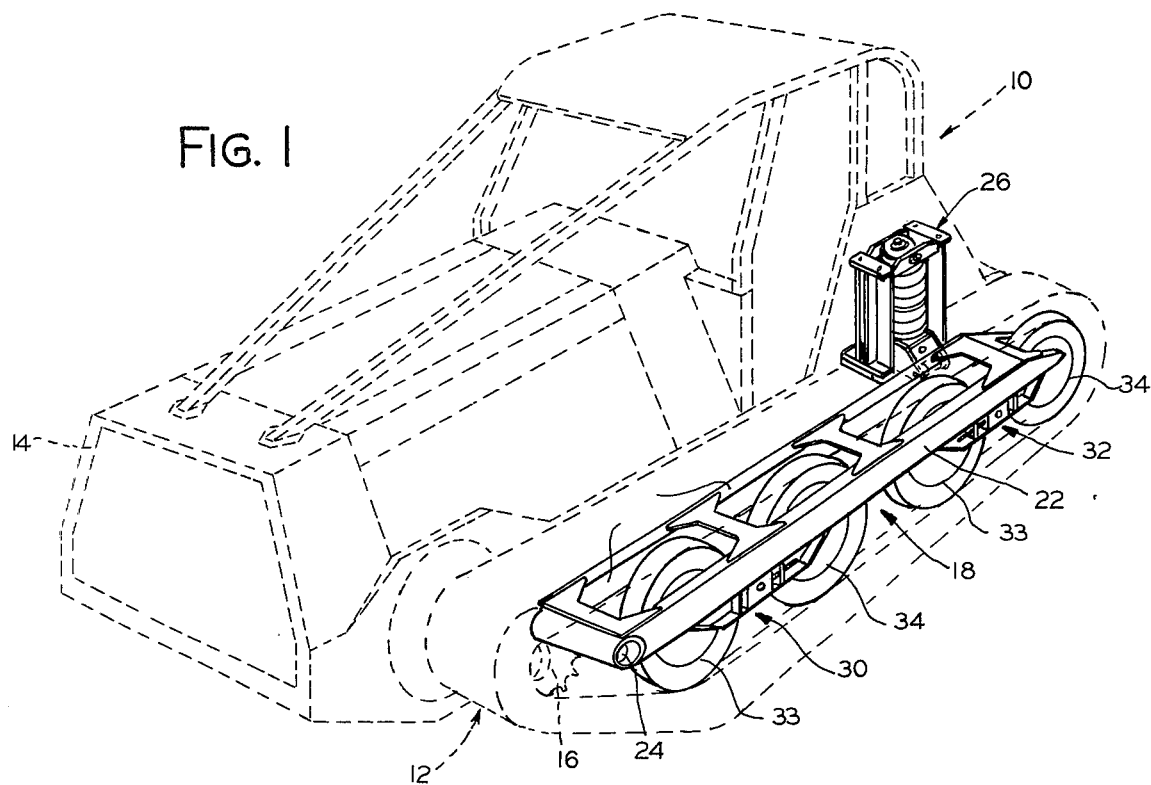
FIG. 1 is a front, left quarter view of a tracked log skidder having a track suspension according to the present invention.

FIG. 1 shows a skidder 10 having a pair of endless tracks 12, 14, one on each side, each powered at the front by a sprocket 16. The tracks 12, 14 run on independent track suspensions 18. The suspensions are identical on the left and right side and the description hereinafter with respect to the left track suspension 18 will be understood as applying equally to the right track suspension 18.

Figure 3:
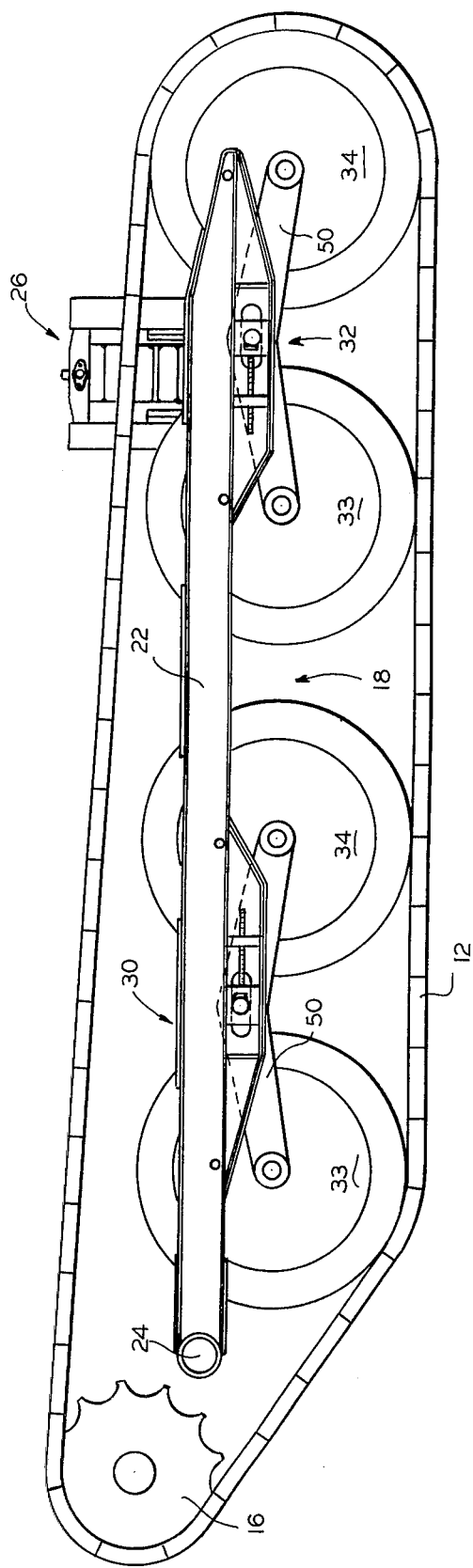
FIG. 3 is a left side elevational view of the track and track suspension.
Figure 4:
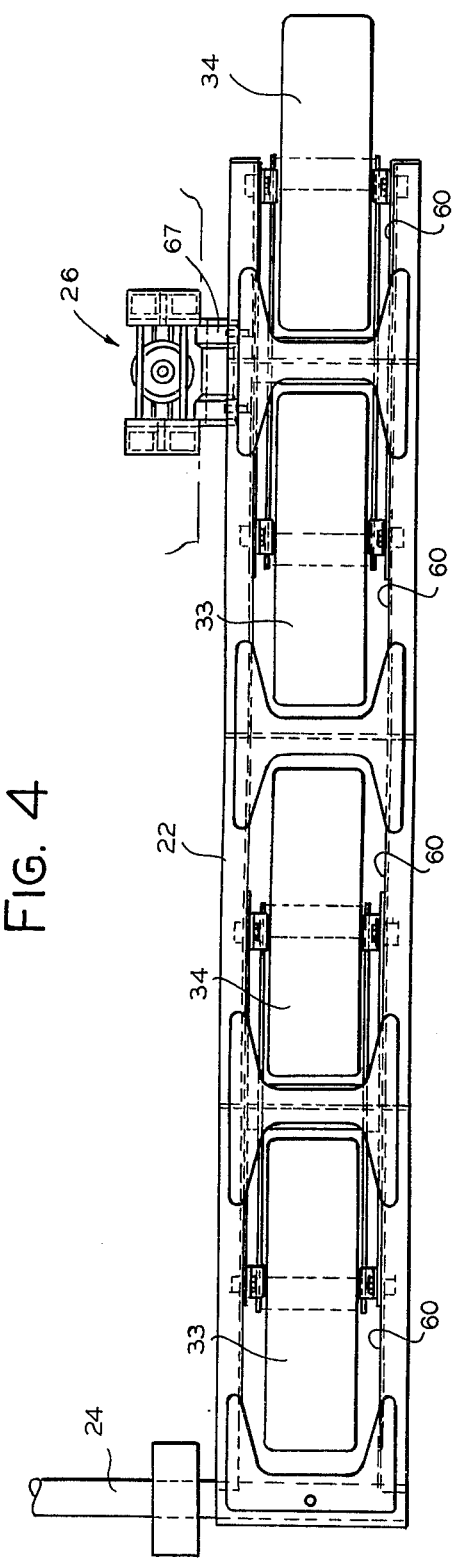
FIG. 4 is a plan view with the track removed showing the suspension beam and rubber spring.

Referring to FIG. 3, the left track suspension 18 includes a longitudinal suspension beam 22 pivoted at the front to a shaft 24 and sprung from the vehicle frame at the rear on a rubber spring 26 described more in detail hereinafter. The pivot of the left suspension beam 22 on the shaft 24 is independent of the pivot of the right beam on shaft 24 which is, as will be noted in FIG. 3, spaced to the rear of the rotational axis of the drive sprocket 16. It will be appreciated therefore that the suspension beam 22 is free to move or swing as an independent suspension; i.e., independent from the right suspension beam 22, while the track drive sprocket 16 is stationery with respect to the vehicle frame. Each track suspension unit 18 is thus seen as including an elongated suspension beam pivoted at one end to the frame behind the drive sprocket and extending longitudinally for substantially the length of the vehicle and being sprung at the opposite end to the frame thus providing a major suspension responding to the major changes in ground reaction forces.

Figure 7:
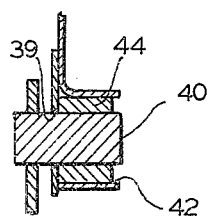
FIG. 7 is a sectional view of the walking beam truck pivot connection with the suspension beam taken along line 7—7 of FIG. 5.

Trucks, 30, 32, one in front and one in the rear, each have a pair of bogie wheels 33, 34 which roll on the bottom runs of the tracks 12, 14. The trucks 30, 32 inside the left track 12 are identical with the trucks inside the right track 14 and the description with respect to the rear truck 32 will be understood as applying equally to each of the others. With respect to the truck 32 in FIG. 5 the suspension beam 22 has an underslung frame portion 38 having a straight midsection 42, which, when viewed in cross section, has a generally channel shaped configuration (FIG. 7). A longitudinally extending slot 39 in the back wall of the frame portion 38 receives a pin 40. A guide block 44 slidably fits within the channel of the straight section 42 and bears against the lower surface. A transverse web 45 has a threaded opening 46 in which a threaded actuator 47 is received. The end 48 of the actuator engages one side of the block 44. The pin 40 is carried on one end by the block 44 and extends through the slot 39 where it pivotally attaches at the opposite end to the walking beam 50. The walking beam 50 has fore and aft extending arms 51, 52. The outer ends rotatably supported the bogie wheels 33, 34. The arms 51 and 52 are directed downwardly at an angle from the pin 40 such that the rotational axes of the front and rear bogie wheels 33, 34 will lie in a horizontal plane when the track is in a substantially horizontal condition. Should the track encounter a variation in the ground, the front and rear bogie wheels 33, 34 will pivot clockwise about the pin 40 such that the forwardly extending arm 51 is swung upwardly and at the extreme, reaches the position shown by the dot-dash lines in FIG. 5 striking a stop 55 fastened to the suspension beam. Similarly, a stop 56 at the rear will be engaged by the arm 52 by a corresponding track deflection at the rear. The oscillations of the walking beams 50 are thus seen as responsive more to local track variations or flexing and primarily to minor ground reaction forces, whereas the suspension motion of the beam 22 is capable of absorbing reaction forces of a greater magnitude over the entire length of the track.

It will be appreciated that one of the features of the invention is that the track tension adjustment is built into the suspension system. The threaded actuator 47 may be threaded to the right to slide the block 44 and the walking beam truck assembly to the right as viewed in FIG. 5 thus taking slack out of the track. Or, the adjustment for the front truck 30 may be performed in a similar manner by threading the actuator to the left (FIG. 3) such that the front bogie wheels 33, 34 will be moved closer to the sprocket 16 and have the effect of advancing the initial ground contact line of the track and thus increase track tension.

It is also a feature of the invention that the rearmost bogie wheel 34 serves the dual purpose of a rear track idler thus cooperating with the dirve sprocket 16 at the front in forming a closed loop or endless track configuration.

It is also advantageous to note in connection with the track suspension of the present invention that the bogie wheels 33, 34 are oversized and extend above the level of the suspension beam 22 (FIG. 3). To permit running clearance for the bogie wheels above the beam 22, cutouts or openings 60 are provided. The oversized bogie wheels are especially suited for rough terrain such as encountered in the logging operations.

Figure 2:
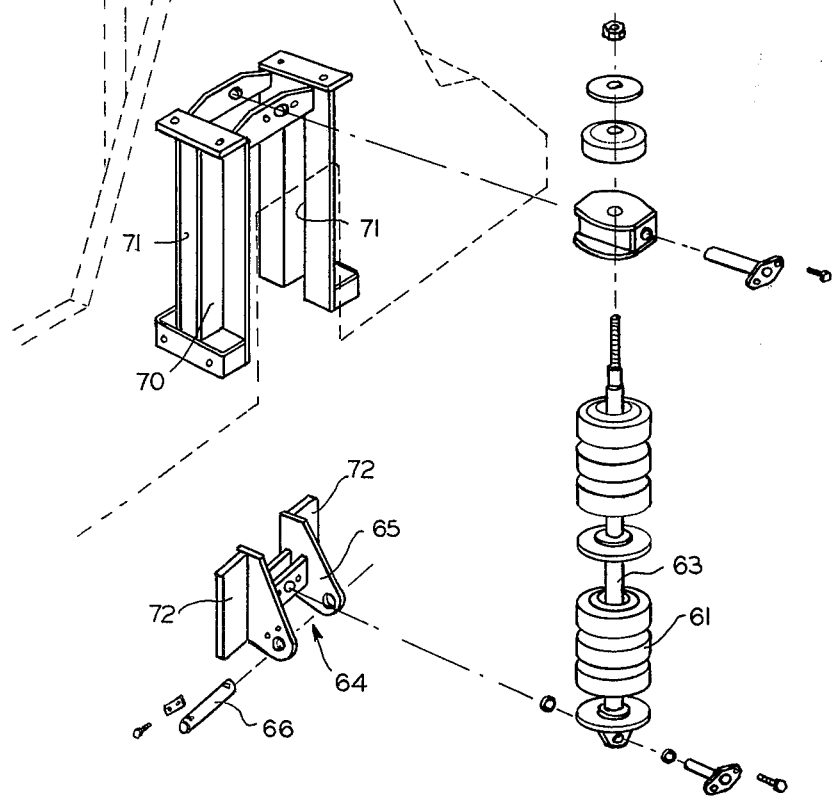
FIG. 2 is a partial left rear quarter view showing the rubber biscuit sprung in exploded form.
Figure 5:
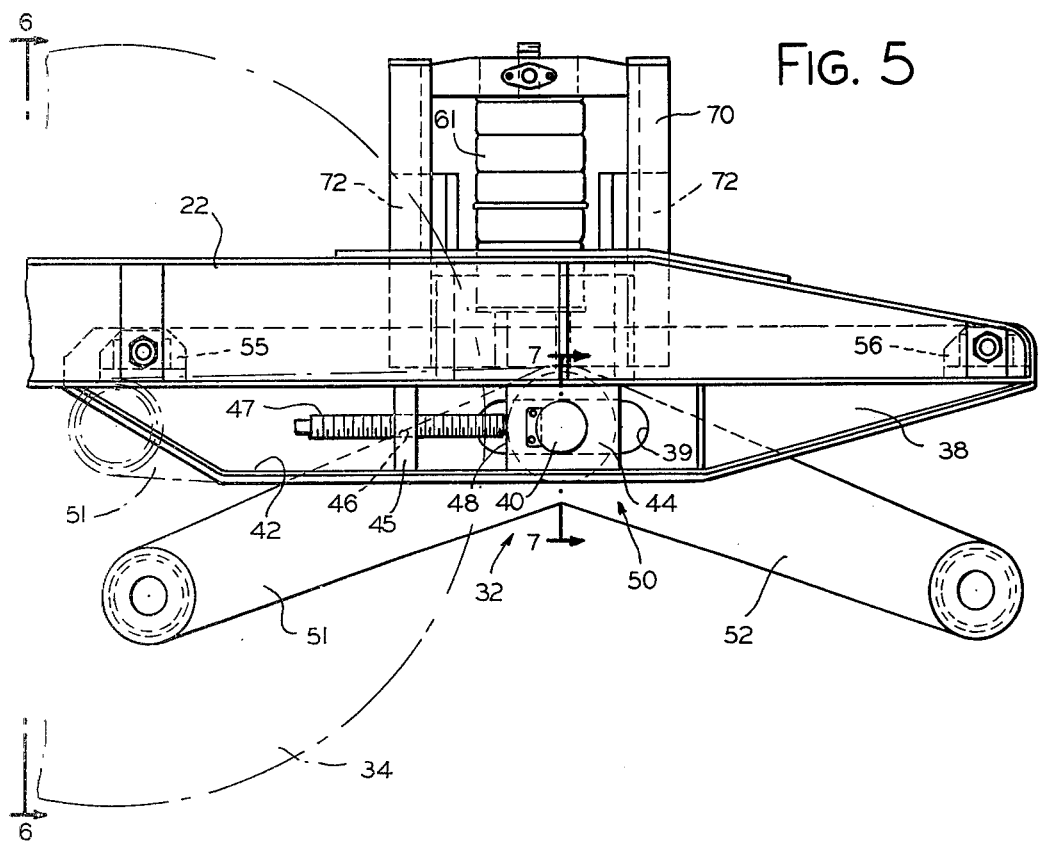
FIG. 5 is a partial rear side view of the suspension beam showing the walking beam and rubber spring mounting in greater detail.
Figure 6:
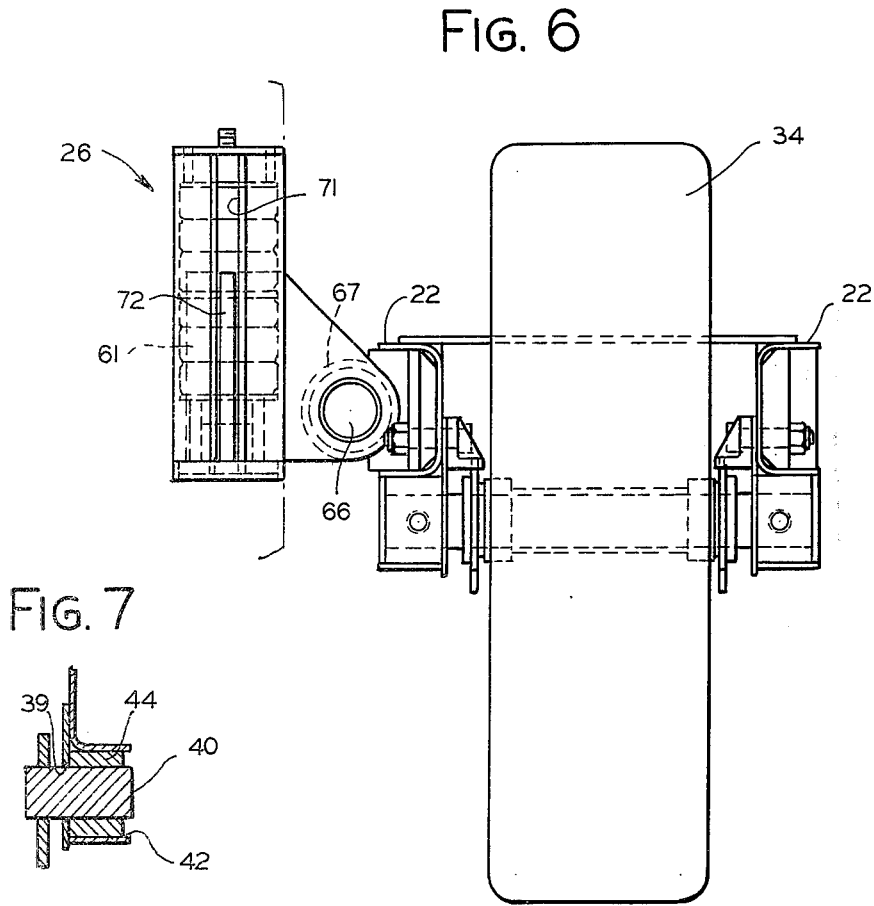
FIG. 6 is a sectional view taken approximately along line 6—6 of FIG. 5.

Each suspension unit 18 is sprung at the rear to the frame by a rubber biscuit spring mounting 26. As best seen in FIGS. 2, 5 and 6 the spring includes a plurality of rubber biscuits 61, stacked on a center deflection rod 63 pivotally mounted on a transverse axis at its lower end on a guide shoe 64 which has a lateral extension 65 pivoted on a pin 66 carried in a longitudinally extending boss 67 mounted on the inside of the suspension beam. A guide frame 70 is secured to the vehicle frame and extends over the stack of biscuits 61. The guide frame 70 has vertically extending slots 71 which receive lateral projections 72 of the guide shoe. Swinging motion of the suspension beam 22 causes the guide shoe 64 to reciprocate in the guide frame 70 compressing and relaxing the rubber biscuits in absorbing the ground reaction forces while the projections 72 sliding in the guide slots 71 provide lateral support during turning movements.

While alternate embodiments of my invention have been disclosed, it will be understood that these descriptions are for purposes of illustration only and that various modifications and changes can be made to my invention without departing from the spirit and scope of it. Therefore, the limits of my invention should be determined from the following appended claims.

What is claimed is:

1. A track-laying vehicle comprising
a frame,
a pair of endless tracks, one on each side,
a pair of drive sprockets rotatably supported on the frame, one on each side, drivingly engaging the tracks at the front of the track loop,
a plurality of bogie wheels rotatably engageable with the lower portion of each track,
a pair of elongated main suspension beams each independently pivoted at opposite ends of an axis rearward of the axis of said drive sprockets and forward of the bogie wheels,
a suspension for said bogie wheels on each suspension beam including a truck frame providing a journal intermediate adjacent pairs of bogie wheels,
a bogie wheel suspension beam pivoted on said journal having fore and aft extending arms supporting a bogie wheel at each end thereof, and
a pair of spring units extending between the vehicle frame and the suspension beams adjacent the rear ends thereof each having a vertical axis of deflection for independently absorbing oscillations of each suspension beam.

2. A track-laying vehicle according to claim 1 wherein front and rear truck frames are each mounted on the main suspension beams and carry pairs of bogie wheels, the rear most bogie wheel cooperating with the drive sprocket as a track idler.

3. A track-laying vehicle according to claim 2 wherein each bogie wheel suspension beam is longitudinally adjustable relative to each truck frame for varying track tension.

4. A track-laying vehicle according to claim 3 wherein the bogie wheels are of larger diameter and the main suspension beams have longitudinally spaced openings over each bogie wheel, permitting them to oscillate on the bogie wheel suspension beams to a level above the main suspension beam.

5. A track-laying vehicle according to claim 4 wherein each truck frame includes a longitudinal slot,
   a channel opposite the slot,
   a guide block slidable in said channel,
   a shaft connected to the bogie wheel suspension beam extending through the slot and connected to the block at the opposite end, and
   a threaded actuator member on the truck frame engageable with the block for moving it to vary track tension.

6. A track-laying vehicle according to claim 1 wherein each spring unit comprises
   a first element movable with the main suspension beam having lateral projections on either side of said axis of deflection,
   a second element fixed to the frame having slats receiving the lateral projections of the first element,
   elastomeric elements stacked in vertical array on the axis of deflection yieldably resisting any relative vertical motion between said first and second elements, and
   said projections and slots cooperating to prevent lateral movement of the main suspension beams.

7. A track-laying vehicle comprising a frame
   a pair of endless tracks, one on each side,
   drive sprockets rotatably supported on the frame driven on a transverse axis at the front of the vehicle drivingly engaging the tracks,
   a pair of main suspension beams each independently pivoted on a transverse axis adjacent the drive sprockets and extending rearwardly for substantially the length of the track,
   a plurality of pairs of enlarged bogie wheels mounted on each main suspension beam,
   a bogie wheel suspension on each main suspension beam for adjacent pairs of bogie wheels comprising,
   an elongated bogie wheel suspension beam pivoted on the main suspension beam intermediate the axex of the bogie wheels having fore and aft extending arms rotatably supporting each bogie wheel, each said arm directed downwardly at an angle from the pivot axis such that the rotational axis of the adjacent bogie wheels is below the pivot axis,
   each said main suspension beam having longitudinally spaced openings over each bogie wheel to receive the upper portion and permit its rotation and oscillation as required by the running conditions of said tracks,
   fore and aft stops mounted on the main suspension beam, said stops being situated in the vertical plane of oscillation of said elongated bogie wheel suspension beam so as to make contact with either said fore or aft arms,
   each main suspension beam having a longitudinally extending slot opposite each bogie wheel suspension beam,
   a channel,
   a guide block slidable in said channel,
   a shaft connected with the bogie wheel suspension beam extending through the slot and connected to the guide block at the opposite end,
   a stationary web in said channel having an internally threaded bore,
   a threaded actuator received in said bore and extending into engagement with one side of said guide block, said threaded actuator being rotatable so as to vary the pivot axis of each beam relative to said main beam for adjusting track tension,
   spring means yieldably supporting the trailing end of each main suspension beam from the vehicle frame comprising
   a first element movable with the suspension beam having lateral projections in a plane parallel to the track,
   a second element fixed to the frame having vertical guide slots receiving said lateral projections providing lateral stability for said main suspension beams, and
   elastomeric means yieldably interposed between said first and second elements for absorbing vertical deflections.

* * * * *